US011499638B2

(12) United States Patent
Bartlett et al.

(10) Patent No.: US 11,499,638 B2
(45) Date of Patent: *Nov. 15, 2022

(54) SEAL

(71) Applicant: Southwest Research Institute, San Antonio, TX (US)

(72) Inventors: Glynn R. Bartlett, Boerne, TX (US); Cody E. Bressler, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/722,119

(22) Filed: Dec. 20, 2019

(65) Prior Publication Data

US 2021/0190207 A1 Jun. 24, 2021

(51) Int. Cl.
*F16J 15/32* (2016.01)
*F16J 15/3284* (2016.01)
*F16J 15/328* (2016.01)

(52) U.S. Cl.
CPC ......... *F16J 15/3284* (2013.01); *F16J 15/328* (2013.01)

(58) Field of Classification Search
CPC ........ F16J 15/328; F16J 15/3284; F16J 15/46; B25J 19/0075; B25J 18/00; B25J 11/005; B64F 5/10; B64F 5/40
See application file for complete search history.

(56) References Cited

U.S. PATENT DOCUMENTS

| 3,428,272 | A |   | 2/1969  | Feder |
| 4,355,000 | A |   | 10/1982 | Lumelleau |
| 4,850,382 | A | * | 7/1989  | Williams ............ B05B 13/0431 |
|           |   |   |         | 134/167 R |
| 5,586,771 | A |   | 12/1996 | Koskinen |
| 2009/0320441 | A1 |   | 12/2009 | Selder et al. |
| 2013/0340585 | A1 |   | 12/2013 | Hermans et al. |
| 2019/0389078 | A1 | * | 12/2019 | Bartlett ................. B25J 13/089 |

FOREIGN PATENT DOCUMENTS

WO 2019/245836 A1 12/2019

* cited by examiner

*Primary Examiner* — Gilbert Y Lee
(74) *Attorney, Agent, or Firm* — N.V. Nederlandsch Octrooibureau

(57) ABSTRACT

A longitudinal translatable seal includes a first compartment extending in a longitudinal direction; a second compartment extending in the longitudinal direction forming a sealing surface with the first compartment; and a carriage translatable longitudinally with respect to the sealing surface, and a port in the carriage to fluidly connect a first side of the seal with a second side of the seal.

24 Claims, 6 Drawing Sheets

SEAL

BACKGROUND

Surface treatment of large vehicles, and in particular, aircrafts, is an important function not only during the manufacturing process but also during the maintenance of aircrafts. The exterior surface of an aircraft must be in satisfactory condition for the aircraft to be able to perform optimally and safely. A debris-ridden, unpolished aircraft can cause chemical deterioration of the aircraft's exterior surface resulting in unnecessary wear and tear and thereby threatening safety and heightening risks of aircraft performance. Accordingly, it imperative to regularly schedule surface treatments of aircrafts, such as the removal of an exterior paint coating and the application of a new paint coating. However, the paint used on the exterior surface of aircrafts, due to the conditions it has to withstand, is not easily removable. Such paint is typically removed by manually applying various chemical solutions to dissolve the paint or sanding of the paint.

SUMMARY

According to a first aspect of the invention, a longitudinal translatable seal comprises a first sealing compartment extending in a longitudinal direction; a sealing compartment extending in the longitudinal direction forming a sealing surface with the first compartment; and a carriage translatable longitudinally with respect to the sealing surface, the carriage comprising a port to fluidly connect a first side of the seal with a second side of the seal.

Such a seal allows for constant pressure to be maintained in the laser and effluent channels as various elements related to surface treatment(s) on large and/or complicated structures are transported.

The first and/or the second sealing compartment are preferably resiliently deformable. The sealing compartments thus to allow easy movement of the carriage along the longitudinal direction.

According to an embodiment, the carriage comprises a central portion comprising the port and tapered edges on each side of the port. Such a carriage allows various elements related to surface treatment(s) to be transported in and out of the beam assembly and allows for constant pressure to be maintained in the laser and effluent channels as the carriage translates along the seal.

According to an embodiment, the first compartment and the second compartment are substantially cylindrical. Such compartments allow a sealing surface to form.

According to an embodiment, the first side of the seal comprises an outer side of the seal and the second side of the seal comprises an inner side of the seal. Such sides define parameters of the seal.

According to an embodiment, the carriage extends longitudinally. Such a carriage allows various elements related to surface treatment(s) to be transported in and out of the beam assembly.

According to an embodiment, the port extends perpendicularly outward from the carriage. Such a port allows various elements related to surface treatment(s) to be transported between the beam assembly and the shoulder.

According to an embodiment the first and/or second sealing compartment are resiliently deformable. Preferably the first and/or second compartments are elastically deformable, for pressing against each other and against the carriage.

According to an embodiment the first and/or second resiliently deformable sealing compartment comprise or are made from an elastically deformable foamed material. For instance, such a foamed material may be contained within a resiliently deformable sleeve of each compartment, wherein the sleeve is made of material having a density that is higher than that of the foamed material. Such a sleeve may protect the foamed material against wear during movement of the carriage. Alternatively, if the sealing compartments are made from the foamed material, then sides of the compartments that are arranged for abutting each other or the carriage may be provided with sealant strips for allowing smooth displacement of the carriage along the sealing compartments.

According to an embodiment, the first sealing compartment is an inflatable compartment and/or the second sealing compartment is an inflatable compartment. Such compartments allow a sealing surface to form when inflated, wherein the pressure with which the sealing surfaces abutt each other can be adjusted by adjusting the air pressure in the seals. Preferably, the first inflatable compartment and the second inflatable compartment are substantially cylindrical.

According to an embodiment, a liquid is provided in the interior of the first sealing compartment and/or the second sealing compartment, wherein the liquid fills at least 70% of the volume of the interior. Upon movement of the carriage, the carriage will displace the liquid, and the liquid will press the sealing compartment against the other sealing compartment and/or against the carriage.

According to a second aspect, the invention provides a beam assembly comprising an interior portion; a seal extending longitudinally along a side of the beam to seal an outside of the beam from the interior portion, the seal comprising: a sealing surface extending longitudinally; and a carriage with a port, wherein the carriage is moveable along the sealing surface.

Such a beam assembly allows for transport of various elements related to surface treatment(s) on large and/or complicated structures without the elements coming into contact with external particles, such as dust and water. The seal may be resiliently deformable.

Preferably, the seal is a seal according to the first aspect of the invention.

According to an embodiment, the seal extends substantially the length of the beam. Such a seal allows for constant pressure to be maintained in the laser and effluent channels along the length of the beam.

According to an embodiment, the seal comprises a first sealing compartment, and a second sealing compartment adjacent to the first sealing compartment and connecting to the first sealing compartment to form the sealing surface when the sealing compartments abut.

According to an embodiment, the first compartment and second compartment are longitudinally extending tubes. Such compartments allow for the seal to form a sealing surface along the length of the beam.

According to an embodiment, the carriage extends longer in the longitudinal direction than the height extending between the compartments. Such a configuration facilitates movement of the carriage along the sealing surface.

According to an embodiment, the seal is an inflatable seal.

According to an embodiment, the inflatable seal comprises: a first inflatable compartment; and a second inflatable compartment adjacent to the first inflatable compartment and connecting to the first inflatable compartment to form the sealing surface when the inflatable compartments are inflated. Such a seal allows for constant pressure to be maintained in the laser and effluent channels as various elements related to surface treatment(s) on large and/or complicated structures are transported.

According to an embodiment, the first inflatable compartment and second inflatable compartment are longitudinally extending tubes. Such compartments allow for the seal to be inflated to form a sealing surface along the length of the beam.

According to an embodiment, the port of the carriage is located at a central position of the carriage. The position of the port in relation to the carriage provides stability for transporting various elements related to surface treatment(s) in and out of the beam assembly and allows the port to move along the sealing surface.

According to an embodiment, the carriage has tapered sides on each side of the port. The sides of the carriage allow for constant pressure to be maintained in the laser and effluent channels as the carriage moves along the sealing surface.

According to an embodiment, the carriage extends longer in the longitudinal direction than the height extending between the inflatable compartments. Such a configuration allows for the carriage to minimize shifts in the gas within the inflatable compartments as the carriage moves along the sealing surface.

According to an embodiment wherein the beam comprises a channel for passage of a laser beam, wherein the channel is open on a side facing one of the seals, and wherein said one of the seals is provided with a deformable reflective layer facing the open side of the channel. The reflective layer can protect the seal in case the laser were to inadvertently be directed onto the seal.

According to an embodiment, the beam further comprises a second seal extending longitudinally along a second side of the beam to seal an outside of the beam from a channel in the interior portion, the second seal comprising: a sealing surface extending longitudinally; and a carriage with a port, the carriage moveable along the sealing surface. Such a seal allows for constant pressure to be maintained in the transport of at least a second element related to a surface treatment on large and/or complicated structures. Preferably, the second seal is a resiliently deformable seal.

According to an embodiment, the second seal is an inflatable seal, e.g. an inflatable seal as described earlier herein.

According to an embodiment, the seal connects to the beam with at least one bracket fixed to the seal and to the beam. Such a bracket allows the seal to be removably connected to the beam.

According to an embodiment, the at least one bracket connects to a side of the beam adjacent to the side of the beam which seal extends. Such a connection defines the position of the seal in relation to the beam.

According to a third aspect of the invention, a method of manufacturing a longitudinal translatable seal, comprises: providing a first sealing compartment extending in a longitudinal direction; providing a second sealing compartment extending in the longitudinal direction; forming a sealing surface between the first sealing compartment and the second sealing compartment; providing a carriage translatable longitudinally with respect to the sealing surface, the carriage comprising a port to fluidly connect a first side of the seal with a second side of the seal.

Such a method allows a seal to maintain constant pressure as various elements related to surface treatment(s) on large and/or complicated structures are transported through a beam assembly.

According to an embodiment, the first and second sealing compartments are inflatable sealing compartments, wherein the method additionally comprises inflating the first inflatable compartment and the second inflatable compartment to a seal pressure.

According to an embodiment, the seal pressure is in the range of 5 psi and 10 psi. Such a seal pressure prevents various elements related to surface treatment(s) from coming into contact with external particles, such as dust and water.

According to an embodiment, the first side of the seal comprises an outer side of the seal; and the second side of the seal comprises an inner side of the seal. Such sides define parameters of the seal.

According to an embodiment, the method further comprises connecting the seal to a side of a beam. Such a connection defines the position of the seal in relation to the beam.

These are various other features and advantages will be apparent from a reading of the following detailed description.

DETAILED DESCRIPTION

Figure 1:
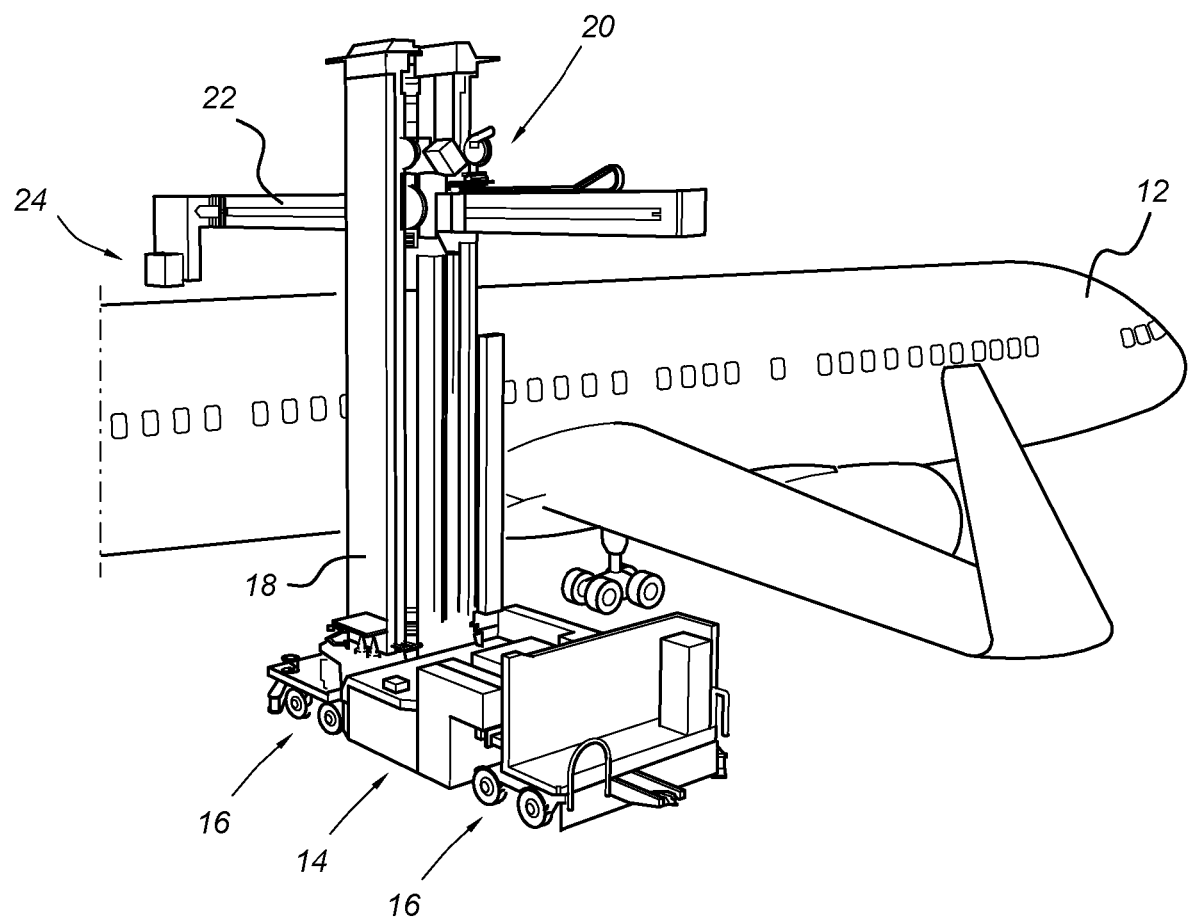
FIG. 1 illustrates a perspective view of a robotic system used for surface treatment of large vehicles.

FIG. 1 illustrates a perspective view of a robotic system 10 used for surface treatment of large vehicles. While system 10 is shown and described as a paint removal system using a high-powered laser beam to ablate coatings by scanning a laser across a surface of aircraft 12, it should be understood that system 10 could be used to provide many different surface treatments, such as, but not limited to, painting, sanding, direct printing, applying or removing other coatings or surface treatments, washing, wipe-down, surface scanning or inspection and repairs. Additionally, system 10 could be used with other vehicles or structures, such as, but not limited to, helicopters, ships, trucks, cars, underwater vehicles, space craft or any vehicles or structures that involve large areas and/or complicated positioning to reach all surfaces.

System 10 is a self-contained surface treatment system comprising mobile base 14 connected to one or more omnidirectional bogies 16. Any needed utilities, such as electrical power, cooling water and gas, may be provided via a tether, though in some cases, only some utilities or even none of these may be needed (e.g., if power is provided by batteries), making system 10 flexible for operations at a variety of locations. Mobile base 14 may accommodate various aircraft and hangar variations by being relatively compact yet stable such that it can drive up to aircraft 12, "park" itself and provide a steady base for operations. Omnidirectional bogies 16 and a flexible suspension system may result in mobile base 14 being able to evenly distribute the large load of system 10 while also being able to smoothly navigate areas that are not level or have obstacles. System 10 may further comprise a number of other components on base 14 related to the particular surface treatment, for example, a laser generator, exhaust filters, batteries, etc.

Surface treatments may be transported from base 14 through interior portions mast 18, shoulder 20, arm 22 and wrist 24, which together provide the structure for system 10. Exhaust gases generated by the surface treatments may also be transported through interior portions of wrist 24, arm 22, shoulder 20 and mast 18 for removal at base 14. In this case, the surface treatments utilize a high-powered laser beam to ablate coatings by scanning the laser beam across the surface of aircraft 12. In order for the laser beam to access and treat any desired surface of aircraft 12, shoulder 20 may be configured to translate arm 22 vertically, horizontally or a combination thereof. Shoulder 20 may also be configured to rotate arm 22 to provide more axes of flexibility. Arm 22 can be a rectangular or square tubular structure, though can be configured differently in different embodiments, and is arranged substantially perpendicular to mast 18 when not rotatably tilted. The length of arm 22 may range from approximately 5 meters to 25 meters, for example, 15 meters. Arm 22 may be configured to transport the laser beam longitudinally through at least part of the arm 22 in order to treat the surface of aircraft 12. Wrist 24 may be positioned at a distal end of arm 22 and may provide even more axes of flexibility, for example, three degrees of flexibility to provide system 10 the ability to access and treat hard to reach surfaces of aircraft 12.

Figure 2A:
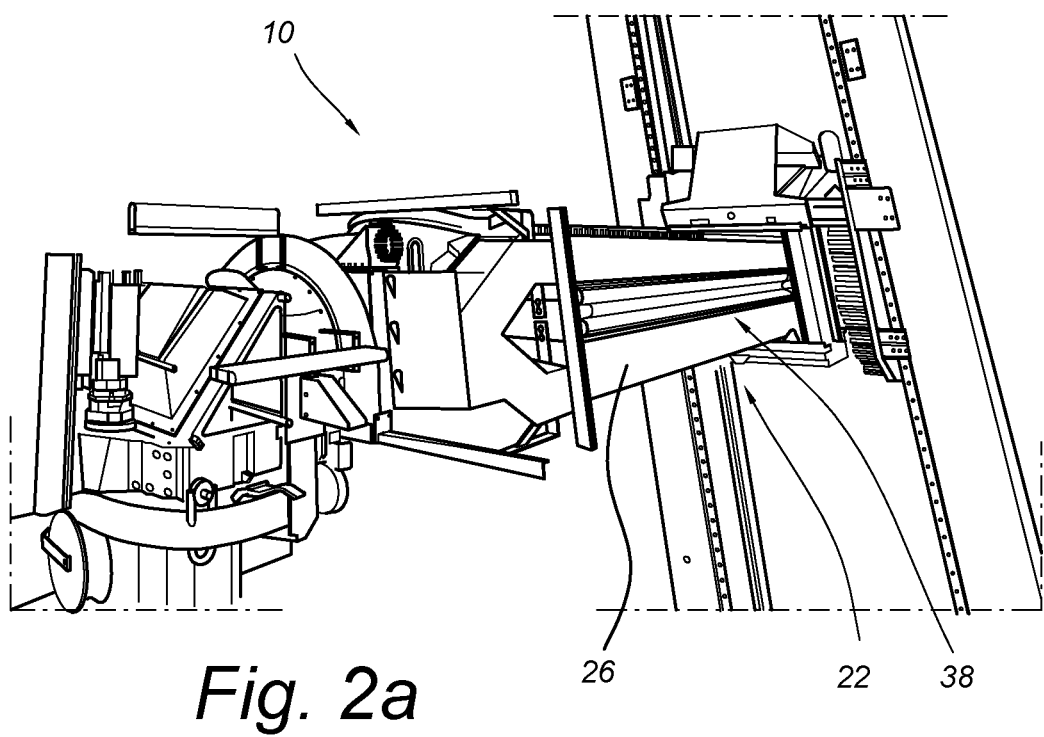
FIG. 2A illustrates a perspective view of an arm of a robotic system used for surface treatment of large vehicles.
Figure 2B:
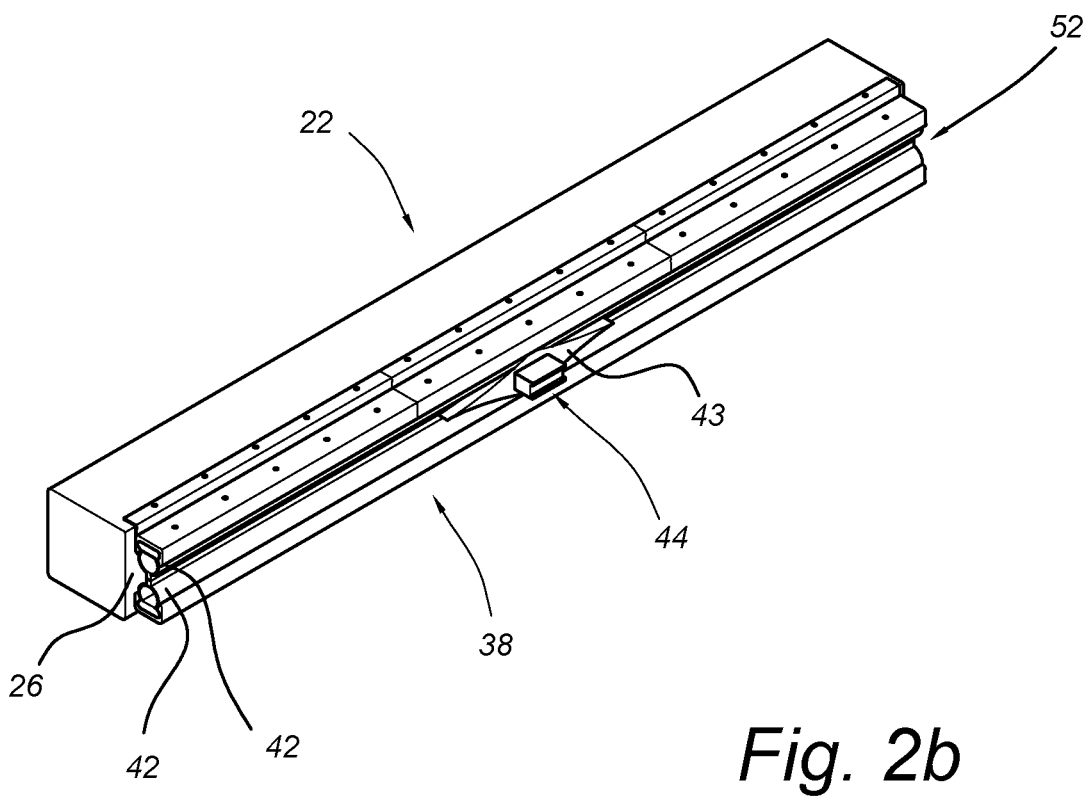
FIG. 2B illustrates a perspective view of the arm seal.
Figure 2C:
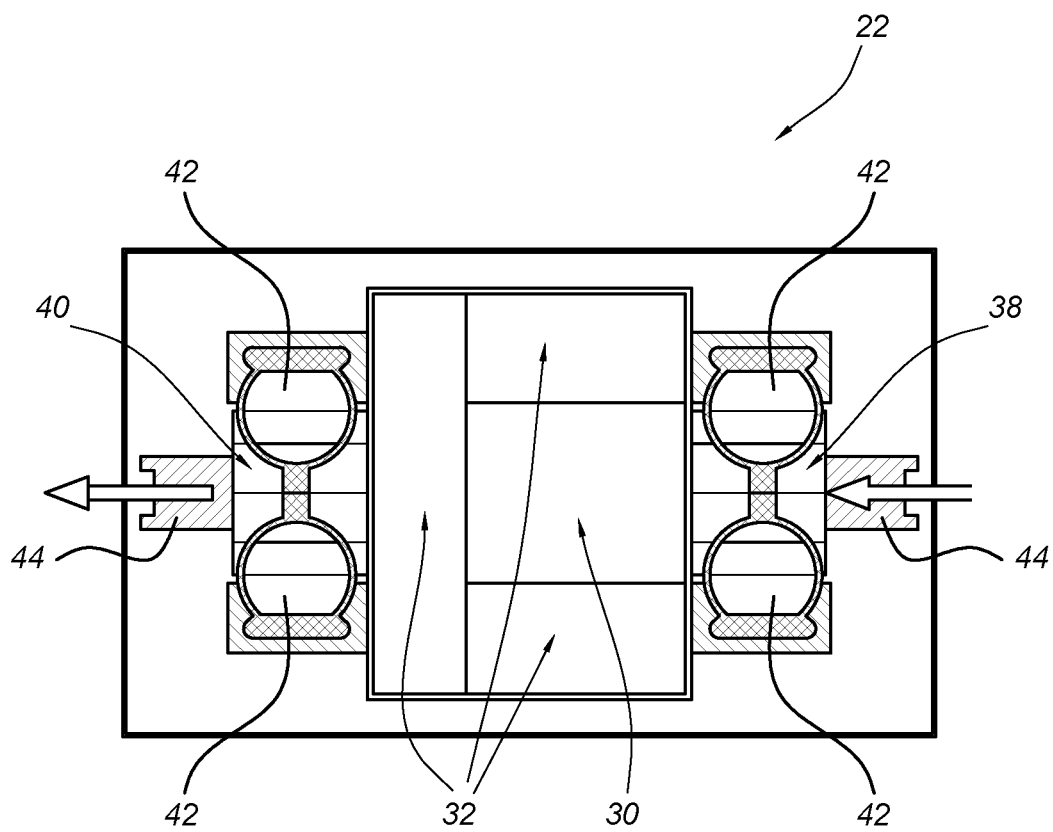
FIG. 2C illustrates a cross-sectional side view of the arm of FIG. 2A.

FIG. 2a illustrates a perspective view of an arm 22 of a robotic system 10 used for surface treatment of large vehicles, FIG. 2b shows a perspective view of only arm 22, and FIG. 2c shows a cross-sectional view of arm 22. Arm 22 includes first side 26 and second side 28, laser channel 30, effluent channels 32, and seals 38, 40. Each of seals 38, 40 include inflatable compartments 42, and carriage 43 with port 44.

Front of arm 22 connects to wrist 24. The wrist 24 typically includes at least two channels such that the laser beam may be transported from arm 22 to the surface of an aircraft through a first channel and the effluent or exhaust gases may be transported from the surface of the aircraft to arm 22 through one or more further channels. These channels also extend through the mast 18 (see FIGS. 4a-4b). Sides 26, 28 of arm 22 each include a seal 38, 40 extending longitudinally along arm 22. First seal 38 is located on first side 26, and second seal 40 is located on second side 28. Seals 38, 40 typically have a similar configuration and extend longitudinally at least a substantial portion of the length of arm 22.

Seals 38, 40 are inflatable seals, typically formed of two inflatable compartments 42 designed to inflate and seal the laser and effluent channels, protecting the integrity during operations. Inflatable compartments 42 may be manufactured from any elastomeric material and connected to sides 26, 28 of arm 22, for example, by bolting or any other means for securing. As shown in FIG. 2b, inflatable compartments 42 can be connected to top and bottom portions of sides 26, 28, though in other embodiments may also be integrated with sides 26, 28, such that arm 22 and inflatable compartments 42 form one continuous structure. Inflatable compartments 42 extend longitudinally adjacent to each other to form a sealing surface between them. The inflation levels of inflatable compartments 42 determine the sealing pressure of seals 38, 40. Typically, inflatable compartments 42 are inflated to a level of about 10 psi, though this can vary. The gas used for inflation of seals 38, 40 can be, for example, air.

Carriage 43 and port 44 are typically one integrated piece, though can be formed in a number of parts, and secured between the inflatable compartments 42. Carriage 43 may be manufactured from any type of durable material and designed to substantially conform to shape of inflatable compartments 42 of seal 38. Port 44 is shown as a rectangular or square tubular structure in the center of carriage 43, though can be other configurations, and is positioned substantially perpendicular to inflatable compartments 42 of seal 38. Carriage 43 is typically widest at port 44, and tapers on either side of port 44 to enable easier translation and ensure sealing as carriage 43 translates. The width of port 44 may range from approximately 0 to 50 centimeters, for example 15 centimeters. Carriage 43 and therefore port 44 are moveable or translatable along the length of seals 38, 40 between inflatable compartments 42.

Figures 4A, 4B:
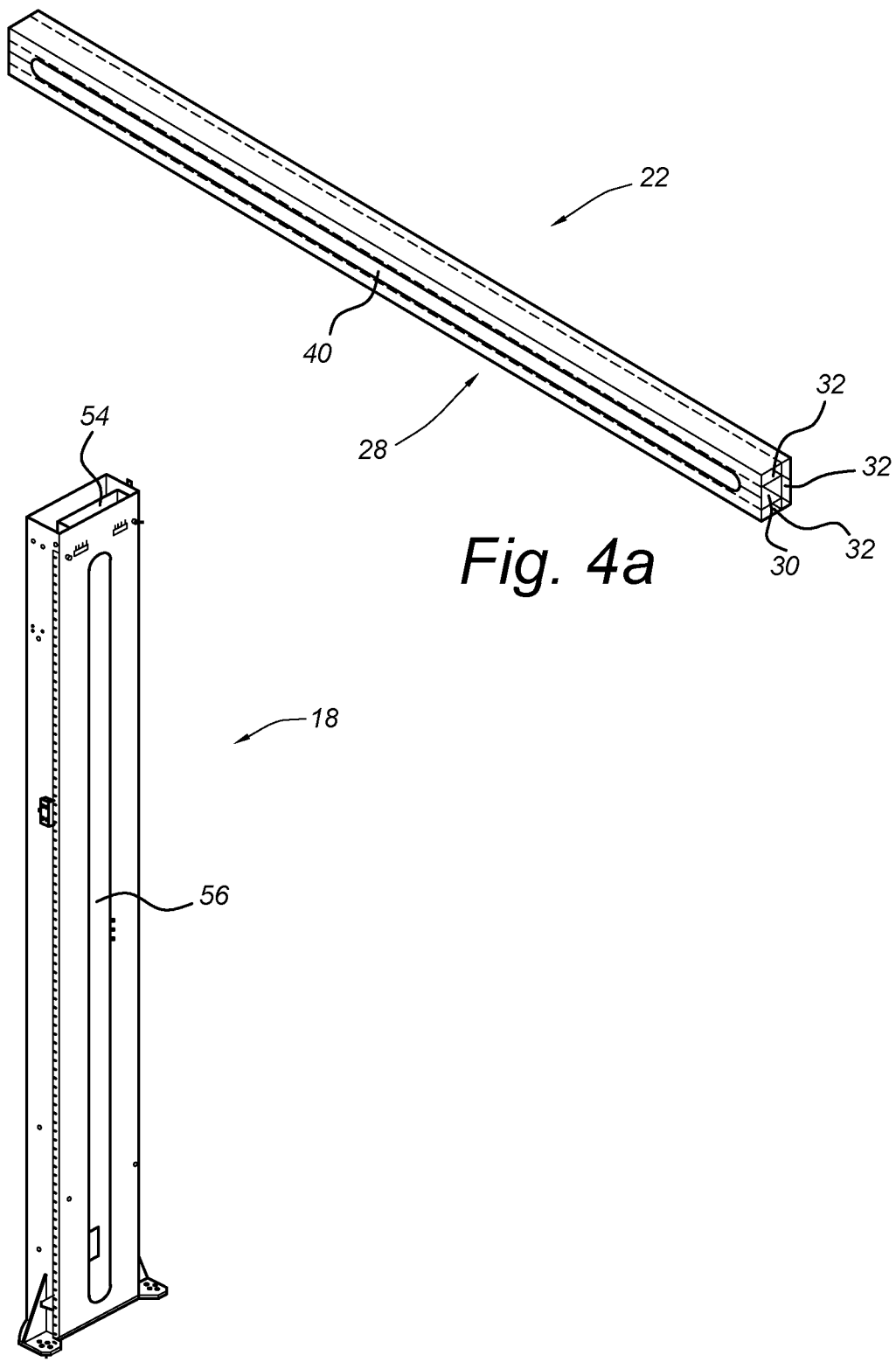
FIG. 4A illustrates partially see-through view of an arm with seal.
FIG. 4B illustrates a partially see-through view of a portion of a mast with seal.

Arm 22 and mast 18 each include a laser channel and at least one effluent channel, as shown in FIGS. 4a-4b. As discussed in relation to FIG. 1, the laser travels through mast 18, arm 22 and wrist 24 to reach a treatment surface of aircraft 12. As such, laser channels within the mast 18 and arm 22 must be connected to allow laser passage from mast 18 to arm 22, despite the relative movements between arm 22 and mast 18. Similarly, effluent channels must be able to connect between arm 22 and mast 18 to allow effluent transport back to base 14. Ports 44 in carriage 43 connect laser/effluent channels between arm 22 and mast 18, allowing for laser and effluent travel between the moving structures.

Seals 38, 40 also enable a constant pressure to be maintained in each of the laser and effluent channels. As the laser beam is transported through carriage 43, a positive pressure cavity may be maintained within the laser beam channel (and a negative pressure can be maintained in the effluent channels). The positive pressure may remain constant as carriage 43 translates along and between inflatable compartments 42 of seal 38. A servo motor rack and pinion mechanism may precisely control the linear position, velocity and acceleration of carriage 43.

Seals 38, 40 with carriages 43 allow for the movements of arm 22 relative to mast 18 while allowing laser or effluent passage from mast 18 to arm 22 (and vice versa) no matter the movements or relative positioning. The ability of carriage 43 to translate along the inflatable compartments 42 allows for the passage of laser/effluent, and the pressure levels of compartments 42 (to maintain a strong sealing surface) as well as the configuration of carriage 43 ensures the respective channels are secured outside of port 44 opening. The inflatable compartments 42 ensure sealing from outside air and other contaminants (which could, for example, interfere with the operations of the laser), while arm 22 translates with respect to the mast 18. The translation of arm 22 with respect to mast 18 also results in the translation of carriage 43 along sealing compartments 42 to maintain the open port 44 between arm 22 and mast 18.

Figure 3A:
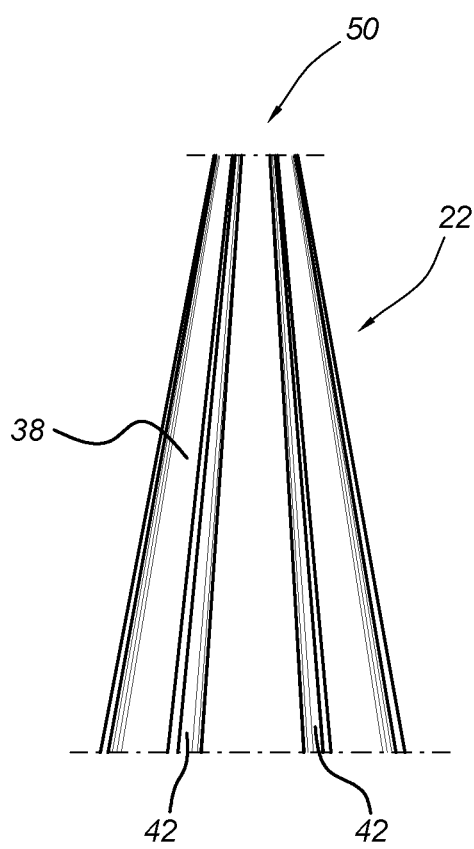
FIG. 3A illustrates a left side view of an arm showing the seal in an open position.
Figure 3B:
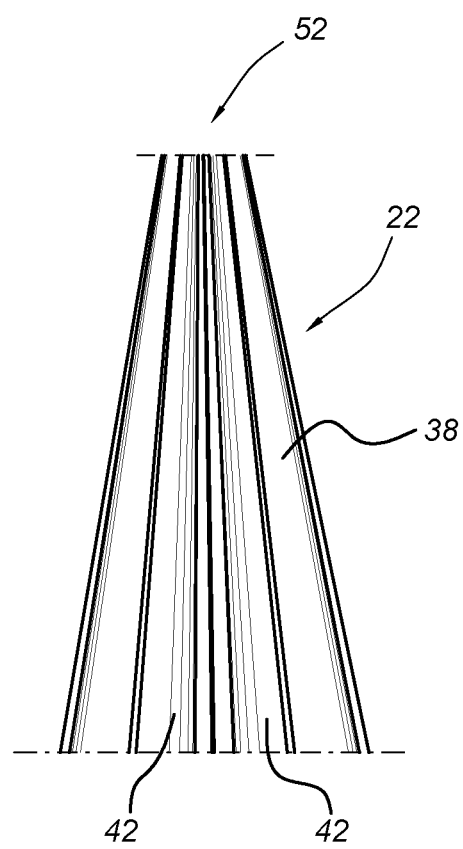
FIG. 3B illustrates a left side view of an arm showing the seal in a closed position.

FIGS. 3A and 3B illustrate a side view of an arm 22 showing the seal 38 in an open 50 and closed 52 position. FIG. 3A shows seal 38 in an open 50 position with inflatable compartments 42 deflated and FIG. 3B shows seal 38 in a closed 52 position with inflatable compartments 42 inflated. Although FIGS. 3A and 3B illustrate seal 38, it should be appreciated that FIGS. 3A and 3B may also illustrate seal 40. Seal 38 may alternate between an open 50 and closed 52 position by inflating and deflating, respectively, inflatable compartments 42 as necessary for cleaning, maintenance, etc. of the system. When inflating, carriage is set such that the proper inflation level with carriage is achieved. Then the translation of carriage 43 simply shifts the gas within inflatable compartments 42.

When seal 38 is in a closed 52 position, external particles, such as dust and water, are prevented from entering the component parts of the system. Dust and water can cause problems in a system such as that described in relation to FIG. 1. The presence of dust and water within the system can cause distortion of the laser beam and can render the system partially or wholly inoperative. As such, the closed 52 position of seal 38 allows arm 22 to maintain a positive pressure cavity free of contaminants for transporting a laser beam or a negative pressure cavity for removing exhaust gas. The positive pressure cavity can be, for example, approximately 0.08 psi while the laser beam is transported from the base to the wrist of the system. The negative pressure cavity can be, for example, approximately 0.05 psi while the exhaust gas is transported from the wrist to the base of the system. As discussed in relation to FIGS. 2a-2c, as the laser beam is transported into and through arm 22 when inflatable compartments 42 of seal 38 are in a closed position. Similarly, exhaust gas may exit exhaust gas channels 32 via port 44 when seal 40 is in a closed position.

FIG. 4a illustrates a partially see-through perspective view of an arm 22, and FIG. 4b shows a partially see-though perspective view of one side of mast 18.

Arm 22 includes laser channel 30, effluent channels 32 and seals 38, 40. Effluent channels 32 are fluidly connected in least at some points as seal only runs along the side of one effluent channel, so any effluent in channels 32 not at the side must also be transported through seal 40 toward mast 18. As shown in FIG. 4a, laser beam channel 30 and exhaust gas channels 32 may share at least one wall. In one embodiment, laser beam channel 30 and exhaust gas channels 32 share three walls such that exhaust gas channels 32 are configured to substantially surround laser beam channel 30 through at least part of the arm 22 (and mast 18). In this embodiment, the exhaust gas channels 32 are substantially C-shaped, however, it should be appreciated that other configurations are possible. In another embodiment, the exhaust gas channels and the laser beam channel may share two walls such that the exhaust gas channels are substantially L-shaped. In yet another embodiment, the exhaust gas channel and the laser beam channel may share only one wall such that the channels are parallel to one another. Accordingly, the laser beam may be transported from the base to the wrist at the same time the exhaust gas is transported from the wrist to the base and without the laser beam and the exhaust gas coming into contact with each other.

When the exhaust gas is transported from the wrist to the base, the exhaust gas temperature may range from approximately 155 to 100° C. As such, exhaust gas channels in wrist 24, arm 22 and/or mast 18 may include at least one means of insulation to minimize the effect of the exhaust gas temperature on the system. The insulation may be positioned on the interior surfaces of exhaust gas channels. Preferably, the insulation will have the effect of minimizing the exhaust gas temperature on external surfaces surrounding exhaust gas channels such that the temperature of these surfaces does not exceed 50° C.

Exhaust gas channels may further comprise a plurality of turning vanes to direct the exhaust gas within exhaust gas channels of wrist 24, arm 22 and/or mast 18 and thereby reduce any resistance and turbulence created when the exhaust gas transitions between vertical and horizontal flows such as when the exhaust gas transitions between a primary exhaust gas channel and secondary exhaust gas channels and/or between different robot portions. In one embodiment, the turning vanes may be positioned at the junction between mast 18 and arm 22 to create uniformity of the exhaust gas flow and improve overall efficiency of the system.

The side of mast 18 shown in FIG. 4b includes laser channel 54 and seal 56. Seal 56 is similar to and acts in the same manner as seals 38, 40 described in relation to arm 22. The other side of mast (not shown) would be a mirror of the side shown in FIG. 4b, and the central channel would simply be the effluent channel instead of a laser channel. Arm 22 extends between the two sides of mast 18, as seen in FIG. 1.

In the robotic system, arm 22 connects to mast 18 such that seal 38 connects to the side shown of the first portion of mast 18, with the carriage 43 of seal 38 connecting to the carriage of seal 56, allowing transport of the laser (or effluent) between the mast 18 and arm 22. Carriages 43 are fixedly connected to the shoulders, ensuring a secure connection between masts 18 and arms 22, with ports 44 allowing for desired pressure to be maintained between the laser channels 30, 54 and for passage of the laser.

Figure 5:
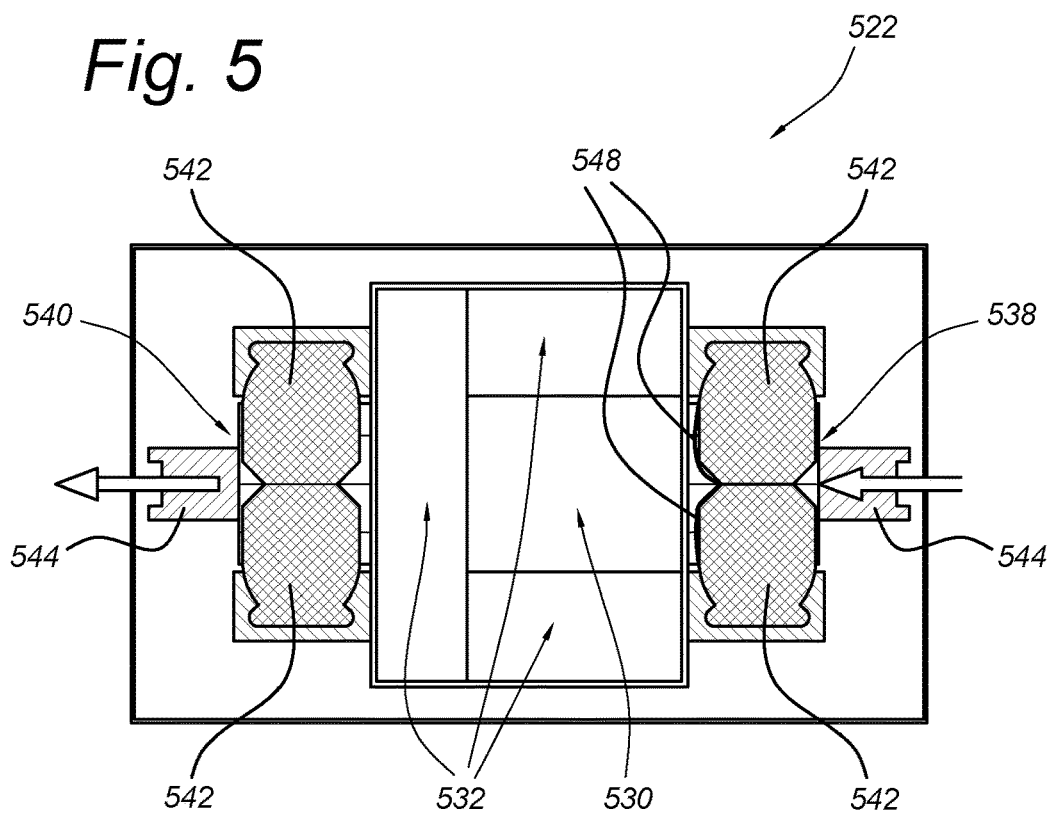
FIG. 5 illustrates a cross-sectional side view of an arm provided with seals according to an embodiment in which the seals a resiliently deformable for sealing against each other.

FIG. 5 shows a cross-sectional side view of an arm 522 similar to the arm 22 shown in FIGS. 2B and 2C, the arm 522 including a first side 526, a second side 528, a laser channel 530 and effluent channels 532, and wherein the arm is provided with longitudinal seals 538, 540. Each of the seals 538, 540 includes sealing compartments 542 and a carriage 543 with a port 544 of a same construction as the carriage 43 and port 44 described earlier herein. However, in this embodiment in order allow the sealing compartments to resiliently deform to a sufficient extent to allow the carriage to pass therebetween while also ensuring that the compartments seal the interior, the sealing compartments 542 are made from an a elastically deformable foamed plastic. In this manner, sealing contact between the sealing compartments 542 of each seal can be achieved without requiring the sealing compartments to be kept at a pressure higher than the ambient air pressure. It will be appreciated that instead of the foamed plastic, one or more other resiliently deformable materials may be used, such as an elastic rubber or rubber-like material.

The laser channel 530 is open along its longitudinal side which faces seal 538. At side of each of the compartments 542 of this seal 538 which face the open end, a deformable reflective layer 548 is provided. These layers 548 hang from the sealing compartments and can deform together with the seal compartments when the carriage is moved along the compartments, and provide some protection of the sealing material of the sealing compartments in case the laser beam were to be incident thereon. The layer is preferably formed from a reflective woven fabric comprising a reflective metal such as aluminum and/or silver.

Figure 6:
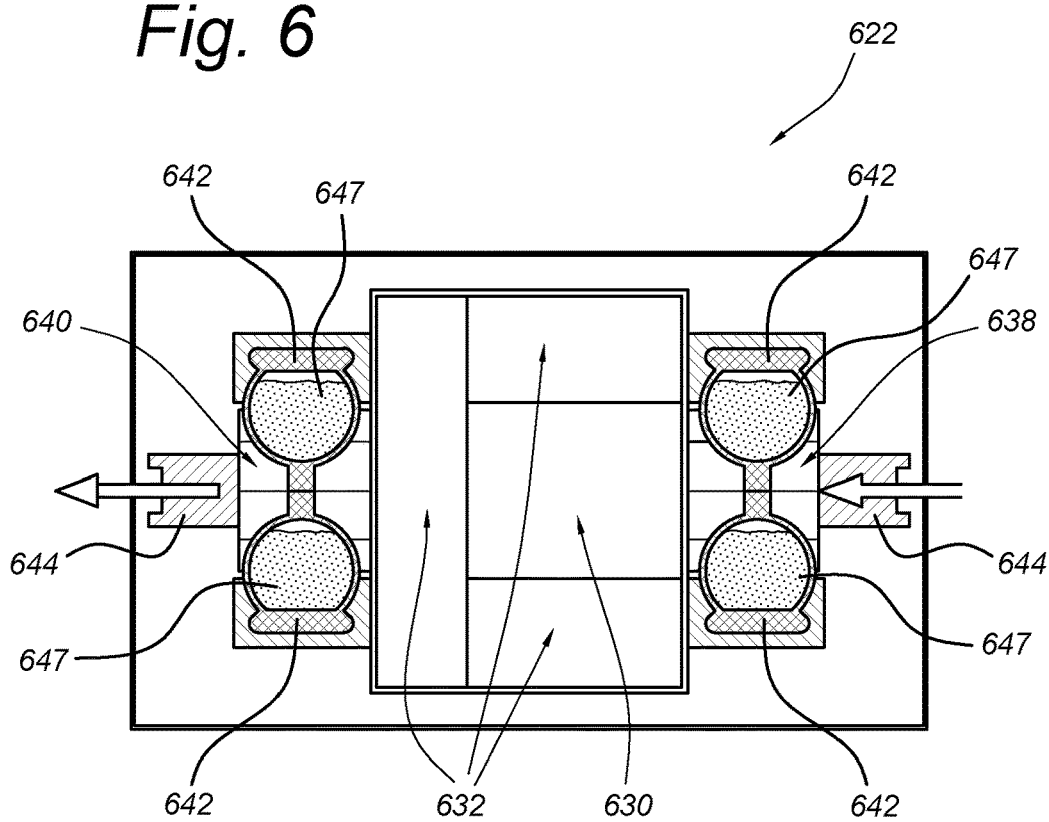
FIG. 6 illustrates a cross-sectional side view of an arm provided with seals according to an another embodiment, in which resiliently deformable sealing compartments are partially filled with a liquid.

FIG. 6 shows a cross-sectional side view another arm 622 that is similar to the arm 22 shown in FIGS. 2B and 2C. Arm 622 includes a first side 626, a second side 628, a laser channel 630 and effluent channels 632, as well as longitudinal seals 638, 648. Each of these seals 638, 640 includes sealing compartments 642, and a carriage 643 with a port 644 of a same construction as the carriage 43 and port 44 described earlier herein. However, in this embodiment, in which the sealing compartments are filled for at least 70% with a liquid 647, such as water. When the carriage is moved along the seal, it will cause the liquid in the compartments to flow away from a portion close to the carriage 644 to remaining portions of the compartments 642, causing the remaining portions to expand so that the remaining portions are press against each other and/or against the carriage.

In summary, seals of the invention with their with carriages, allow for a gas-tight seal while allowing a passage between parts which move relative to each other. The use of two sealing compartments with translatable carriage with port allow for both the passages of a laser and effluent gases between mast and arm of the robotic system. This also allows for the maintenance of desired pressure through the different movable components of the system. While the seal has been described in use with robotic system 10 shown, it could be used with other systems with relative moving parts in which it is desirable to allow passage of fluids or other components between parts.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A longitudinal translatable seal, comprising:
a first compartment extending in a longitudinal direction;
a second compartment extending in the longitudinal direction forming a sealing surface with the first compartment; and
a carriage translatable longitudinally with respect to the sealing surface, and
a port in the carriage to fluidly connect a first side of the seal with a second side of the seal.

2. The seal of claim 1, wherein the carriage comprises a central portion comprising the port and tapered edges on each side of the port.

3. The seal of claim 1, wherein the first compartment and the second compartment are substantially cylindrical.

4. The seal of claim 1, wherein the first side of the seal comprises an outer side of the seal; and wherein the second side of the seal comprises an inner side of the seal.

5. The seal of claim 1, wherein the carriage extends longitudinally.

6. The seal of claim 1, wherein the port extends perpendicularly outward from the carriage.

7. The seal of claim 1, wherein the first and/or second sealing compartment are resiliently deformable.

8. The seal of claim 7, wherein the first and/or second resiliently deformable sealing compartment comprise or are made from an elastically deformable foamed material.

9. The seal of claim 1, wherein each of the first and second sealing compartment is provided with a sealing surface for abutting the sealing surface of the other of the first and second sealing compartment.

10. The seal of claim 1, wherein the first sealing compartment is an inflatable compartment and/or wherein the second compartment is an inflatable compartment.

11. A beam assembly, comprising:
an interior portion;
a seal extending longitudinally along a side of the beam to seal an outside of the beam from the interior portion, the seal comprising:
a sealing surface extending longitudinally; and
a carriage with a port, the carriage moveable along the sealing surface.

12. The beam of claim 11, wherein the seal extends substantially the length of the beam, preferably wherein the carriage extends longer in the longitudinal direction than the height extending between the sealing compartments.

13. The beam of claim 11, wherein the seal comprises:
a first inflatable compartment; and
a second inflatable compartment adjacent to the first inflatable compartment and connecting to the first inflatable compartment to form the sealing surface when the inflatable compartments are inflated.

14. The beam of claim 13, wherein the first inflatable compartment and second inflatable compartment are longitudinally extending tubes.

15. The beam of claim 11, wherein the port of the carriage is located at a central position of the carriage.

16. The beam of claim 11, wherein the carriage has tapered sides on each side of the port.

17. The beam of claim 11, wherein the beam comprises a channel for passage of a laser beam, wherein the channel is open on a side facing one of the seals, wherein said one of the seals is provided with a deformable reflective layer facing the open side of the channel.

18. The beam of claim 11, further comprising a second seal extending longitudinally along a second side of the beam to seal an outside of the beam from a channel in the interior portion, the second seal comprising:
a sealing surface extending longitudinally; and
a carriage with a port, the carriage moveable along the sealing surface.

19. The beam of claim 11, wherein the seal connects to the beam with at least one bracket fixed to the seal and to the beam, preferably wherein the at least one bracket connects to a side of the beam adjacent to the side of the beam which seal extends.

20. A method of manufacturing a longitudinal translatable seal, comprising:
providing a first sealing compartment extending in a longitudinal direction;
providing a second sealing compartment extending in the longitudinal direction;
forming a sealing surface between the first sealing compartment and the second sealing compartment;
providing a carriage translatable longitudinally with respect to the sealing surface, the carriage comprising a port to fluidly connect a first side of the seal with a second side of the seal.

21. The method of claim 20, wherein the first sealing compartment is an inflatable sealing compartment and the second sealing compartment is an inflatable sealing compartment, the method further comprising:
inflating the first inflatable compartment and the second inflatable compartment to a seal pressure, preferably wherein the seal pressure is in the range of 5 psi and 10 psi.

22. The method of claim 20, wherein the first side of the seal comprises an outer side of the seal; and wherein the second side of the seal comprises an inner side of the seal.

23. The method of claim 20, further comprising: connecting the seal to a side of a beam.

24. The method of claim 20, wherein the first sealing compartment and the second sealing compartment are resiliently deformable sealing compartments, preferably wherein the first and/or second resiliently deformable sealing compartment comprise or are made from an elastically deformable foamed material.

\* \* \* \* \*